US010540430B2

(12) United States Patent
Locke

(10) Patent No.: US 10,540,430 B2
(45) Date of Patent: Jan. 21, 2020

(54) TECHNIQUES FOR PROVIDING A NATURAL LANGUAGE NARRATIVE

(75) Inventor: Matthew Locke, Cameron Park, CA (US)

(73) Assignee: CBS Interactive Inc., New York, NY (US)

( * ) Notice: Subject to any disclaimer, the term of this patent is extended or adjusted under 35 U.S.C. 154(b) by 1476 days.

(21) Appl. No.: 13/338,409

(22) Filed: Dec. 28, 2011

(65) Prior Publication Data

US 2013/0174026 A1 Jul. 4, 2013

(51) Int. Cl.
| | | |
|---|---|---|
| *G06F 17/00* | (2019.01) | |
| *G06F 17/24* | (2006.01) | |
| *G06F 17/27* | (2006.01) | |
| *G06F 17/21* | (2006.01) | |
| *G06Q 10/10* | (2012.01) | |

(52) U.S. Cl.
CPC .............. *G06F 17/24* (2013.01); *G06F 17/21* (2013.01); *G06F 17/274* (2013.01); *G06Q 10/10* (2013.01)

(58) Field of Classification Search
CPC ........... G06F 19/3487; G06F 17/30684; G06F 17/24; G06F 17/274; G06F 17/21; G06Q 10/10
See application file for complete search history.

(56) References Cited

U.S. PATENT DOCUMENTS

| | | |
|---|---|---|
| 4,992,939 A | 2/1991 | Tyler |
| 5,043,891 A | 8/1991 | Goldstein et al. |
| 5,731,991 A | 3/1998 | Kinra et al. |
| 5,802,495 A | 9/1998 | Goltra |
| 5,913,215 A | 6/1999 | Rubinstein et al. |
| 5,963,919 A | 10/1999 | Brinkley et al. |
| 5,963,939 A | 10/1999 | McCann et al. |
| 6,034,652 A | 3/2000 | Freiberger et al. |
| 6,236,990 B1 | 5/2001 | Geller et al. |
| 6,263,507 B1 | 7/2001 | Ahmad et al. |
| 6,544,040 B1 | 4/2003 | Brelis et al. |
| 6,571,236 B1 | 5/2003 | Ruppelt |
| 6,651,219 B1 * | 11/2003 | Elliott ..................... G06F 17/24 715/209 |
| 6,757,682 B1 | 6/2004 | Naimark et al. |

(Continued)

OTHER PUBLICATIONS

Fantasy Journalist website, retrieved at <http://www.fantasyjournalist.com> on Jan. 17, 2014, 5 pages, (author unknown).

(Continued)

*Primary Examiner* — Chau T Nguyen
*Assistant Examiner* — David Faber

(57) ABSTRACT

Various embodiments for providing a natural language narrative are described. Embodiments may include a summary engine that collects data about an event, and selects a template to narrate a story about the event. A template may include static text, slots for data from the event, and slots for dynamic word choice. Templates may be selected according to a story type and story "flavor." Templates may also include conditions that determine a choice of the use of template sub-sections. Various aspects of the templates may be selected randomly, to create the impression that the story is human-generated. The stories may be published to a variety of locations and formats. Other embodiments are described and claimed.

18 Claims, 10 Drawing Sheets

(56) References Cited

U.S. PATENT DOCUMENTS

| | | |
|---|---|---|
| 6,788,314 B1 | 9/2004 | Freiberger et al. |
| 6,976,031 B1 | 12/2005 | Toupal et al. |
| 7,069,308 B2 | 6/2006 | Abrams |
| 7,080,019 B1 | 7/2006 | Hurzeler |
| 7,194,405 B2 | 3/2007 | Tavor |
| 7,333,967 B1 | 2/2008 | Bringsjord et al. |
| 7,418,447 B2 | 8/2008 | Caldwell et al. |
| 7,472,110 B2 | 12/2008 | Achlioptas |
| 7,530,018 B2 | 5/2009 | Bischoff |
| 7,720,723 B2 | 5/2010 | Dicker et al. |
| 7,783,528 B2 | 8/2010 | Musgrove et al. |
| 7,809,601 B2 | 10/2010 | Shaya et al. |
| 7,840,448 B2 | 11/2010 | Musgrove et al. |
| 7,856,390 B2 | 12/2010 | Schiller |
| 8,019,656 B2 | 9/2011 | Baran et al. |
| 8,036,995 B2 | 10/2011 | Van Doom |
| 8,355,903 B1 | 1/2013 | Birnbaum et al. |
| 8,374,848 B1 | 2/2013 | Birnbaum et al. |
| 8,515,737 B2* | 8/2013 | Allen .................. G06F 17/248 704/9 |
| 8,630,844 B1 | 1/2014 | Nichols et al. |
| 9,342,507 B1* | 5/2016 | Kaeser ............... G06F 17/2881 |
| 2001/0032077 A1 | 10/2001 | Tavor |
| 2002/0044045 A1* | 4/2002 | Crookham ............ G06Q 30/02 340/323 R |
| 2002/0055379 A1 | 5/2002 | Saidakovsky et al. |
| 2002/0161664 A1 | 10/2002 | Shaya et al. |
| 2002/0188556 A1 | 12/2002 | Colica et al. |
| 2003/0061208 A1 | 3/2003 | Ohashi |
| 2003/0105682 A1 | 6/2003 | Dicker et al. |
| 2003/0135460 A1 | 7/2003 | Talegon |
| 2003/0185368 A1 | 10/2003 | Bradfield et al. |
| 2003/0208755 A1* | 11/2003 | Zimmerman ...... H04N 5/44543 725/34 |
| 2003/0212955 A1 | 11/2003 | Bischoff |
| 2003/0229900 A1 | 12/2003 | Reisman |
| 2004/0015415 A1 | 1/2004 | Cofino et al. |
| 2004/0024656 A1 | 2/2004 | Coleman |
| 2004/0091848 A1 | 5/2004 | Nemitz |
| 2004/0148275 A1 | 7/2004 | Achlioptas |
| 2004/0225651 A1 | 11/2004 | Musgrove et al. |
| 2004/0253569 A1* | 12/2004 | Deane .................. G09B 17/00 434/178 |
| 2005/0075940 A1 | 4/2005 | DeAngelis |
| 2005/0159220 A1 | 7/2005 | Wilson et al. |
| 2005/0198031 A1 | 9/2005 | Pezaris et al. |
| 2006/0101335 A1* | 5/2006 | Pisciottano ........... G06F 17/248 715/211 |
| 2006/0135232 A1 | 6/2006 | Willis |
| 2006/0190392 A1 | 8/2006 | Samid |
| 2006/0252476 A1 | 11/2006 | Bahou |
| 2006/0258419 A1 | 11/2006 | Winkler et al. |
| 2007/0011367 A1* | 1/2007 | Scott .................... G06Q 10/10 710/48 |
| 2007/0132767 A1 | 6/2007 | Wright et al. |
| 2007/0143119 A1 | 6/2007 | Jung et al. |
| 2007/0198355 A1 | 8/2007 | Samson et al. |
| 2007/0204211 A1 | 8/2007 | Paxson |
| 2007/0207845 A1 | 9/2007 | Gottlieb |
| 2007/0225071 A1 | 9/2007 | Van Luchene et al. |
| 2008/0086512 A1 | 4/2008 | Fahys |
| 2008/0096664 A1 | 4/2008 | Baray et al. |
| 2008/0097733 A1* | 4/2008 | Alsafadi ............... G06F 19/325 703/6 |
| 2008/0161113 A1 | 7/2008 | Hansen et al. |
| 2008/0207327 A1 | 8/2008 | Van Luchene et al. |
| 2008/0215607 A1 | 9/2008 | Kaushansky et al. |
| 2008/0287198 A1 | 11/2008 | Callery et al. |
| 2008/0306925 A1 | 12/2008 | Campbell et al. |
| 2009/0100409 A1 | 4/2009 | Toneguzzo |
| 2009/0149248 A1 | 6/2009 | Busey et al. |
| 2009/0187407 A1* | 7/2009 | Soble ..................... G10L 13/00 704/260 |
| 2009/0201318 A1 | 8/2009 | Silverstein et al. |
| 2009/0253517 A1 | 10/2009 | Bererton et al. |
| 2009/0259697 A1 | 10/2009 | Satou et al. |
| 2010/0197374 A1 | 8/2010 | Kiovisto |
| 2010/0203970 A1 | 8/2010 | Hope |
| 2010/0211431 A1 | 8/2010 | Lutnick et al. |
| 2010/0227685 A1 | 9/2010 | Mori |
| 2010/0268776 A1 | 10/2010 | Gerke |
| 2011/0029339 A1 | 2/2011 | Callahan |
| 2011/0087486 A1* | 4/2011 | Schiller .................. G06Q 40/06 704/9 |
| 2011/0099195 A1* | 4/2011 | Patwardhan .......... G06F 16/738 707/769 |
| 2011/0165946 A1 | 7/2011 | Pavlich et al. |
| 2011/0246182 A1* | 10/2011 | Allen .................... G06F 17/248 704/9 |
| 2011/0258258 A1 | 10/2011 | Briere et al. |
| 2011/0261071 A1 | 10/2011 | Ganetakos et al. |
| 2011/0311205 A1 | 12/2011 | McClanahan et al. |
| 2012/0010979 A1 | 1/2012 | Ramer et al. |
| 2012/0087637 A1 | 4/2012 | Logan et al. |
| 2012/0142429 A1 | 6/2012 | Muller |
| 2012/0220375 A1* | 8/2012 | Williams .............. A63F 13/828 463/42 |
| 2013/0060361 A1 | 3/2013 | Gabrail et al. |
| 2013/0173673 A1* | 7/2013 | Miller .................... G06F 17/24 707/804 |
| 2013/0174026 A1* | 7/2013 | Locke .................... G06Q 10/10 715/254 |
| 2013/0262092 A1 | 10/2013 | Wasick |
| 2014/0067702 A1 | 3/2014 | Rathod |
| 2014/0087875 A1 | 3/2014 | Ham |
| 2015/0352449 A1 | 12/2015 | Nangia |

OTHER PUBLICATIONS

Office action received for U.S. Appl. No. 13/338,395, dated Mar. 24, 2015, 15 pages.

International Search Report, Application No. PCT/US2008/068916 dated Feb. 4, 2009.

EPO "Notice from the European Office dated Oct. 1, 2007 Concerning Business Methods", Official Journal of the European Patent Office, Nov. 1, 2007, pp. 592-593, vol. 30, No. 11.

Dale, et al., "Dynamic Document Delivery: Generating Natural Language Texts on Demand", 6 pages, dexa, pp. 131, 9th International Workshop on Database and Expert Systems Applications (DEXA '98), 1998.

International Search Report for PCT/US04/13595 dated Sep. 12, 2008.

Chai, Joyce, et al., "Natural Language Assistant: A Dialog System for Online Product Recommendation", AI Magazine, La Canada, Summer 2002, vol. 23, issue 2, p. 63.

Gardner, G. "Silicon Wadi", Jerusalem Post. Jerusalem: Feb. 14, 2002.

Scorbitz / Get on Board, http://getonboard.scorbitz.com, 9 webpages downloaded Aug. 23, 2012.

Office Action received for U.S. Appl. No. 13/338,395, dated Sep. 19, 2016, 30 pages.

Office Action received for U.S. Appl. No. 13/338,395, dated Feb. 23, 2016, 29 pages.

Office Action received for U.S. Appl. No. 13/338,395, dated Apr. 10, 2017, 30 pages.

* cited by examiner

TECHNIQUES FOR PROVIDING A NATURAL LANGUAGE NARRATIVE

CROSS-REFERENCE TO RELATED APPLICATIONS

This application is related to commonly owned and co-pending U.S. patent application Ser. No. 13/338,395, titled "TECHNIQUES FOR PROVIDING A NARRATIVE SUMMARY FOR FANTASY GAMES", filed on Dec. 28, 2011, which is incorporated by reference in its entirety.

BACKGROUND

Vast amounts of data are generated from various events, such as sporting events. It may be difficult for some consumers to understand an event from data alone. There may not, however, be enough resources, e.g. writers and/or time, to create a story from the data in way that is understandable and enjoyable to consumers. Accordingly, there may be a need for an improved apparatus and methods for providing a natural language narrative about the various events.

DETAILED DESCRIPTION

Various embodiments are directed to techniques for providing a natural language narrative generated from data about an event. Events may include, without limitation, sports events at any level, e.g. high school, little league, recreational league, college, professional, amateur, team sports, and individual sports. Events may further include, without limitation, a contest; a reality television show; a concert; a live event; a game; a fantasy game; a tournament; a political event, such as a debate, legislative activity, and an election; and a fund raising event. Data may be generated during these events, such as, for sports: scores, plays made, individual player statistics, and team statistics. Data may also include, for example, results of a contest, game, tournament, or reality TV elimination round; money raised; election results; and so forth.

Embodiments may include a summary engine that collects data about an event, and selects a template to narrate a story about the event. A template may include static text, slots for data from the event, and slots for dynamic word choice. Templates may be selected according to a story type and story "flavor." Templates may also include conditions that determine a word choice for a dynamic word slot. Various aspects of the templates may be selected randomly, to create the impression that the story is human-generated. The stories may be published to a variety of locations and formats. Embodiments may generate narrative stories about events from the data that make the events more understandable and approachable for the story consumer. The narrative stories may also generate interest in viewing other aspects of a publishing site, potentially increasing viewing traffic and advertising revenue.

Figure 1:
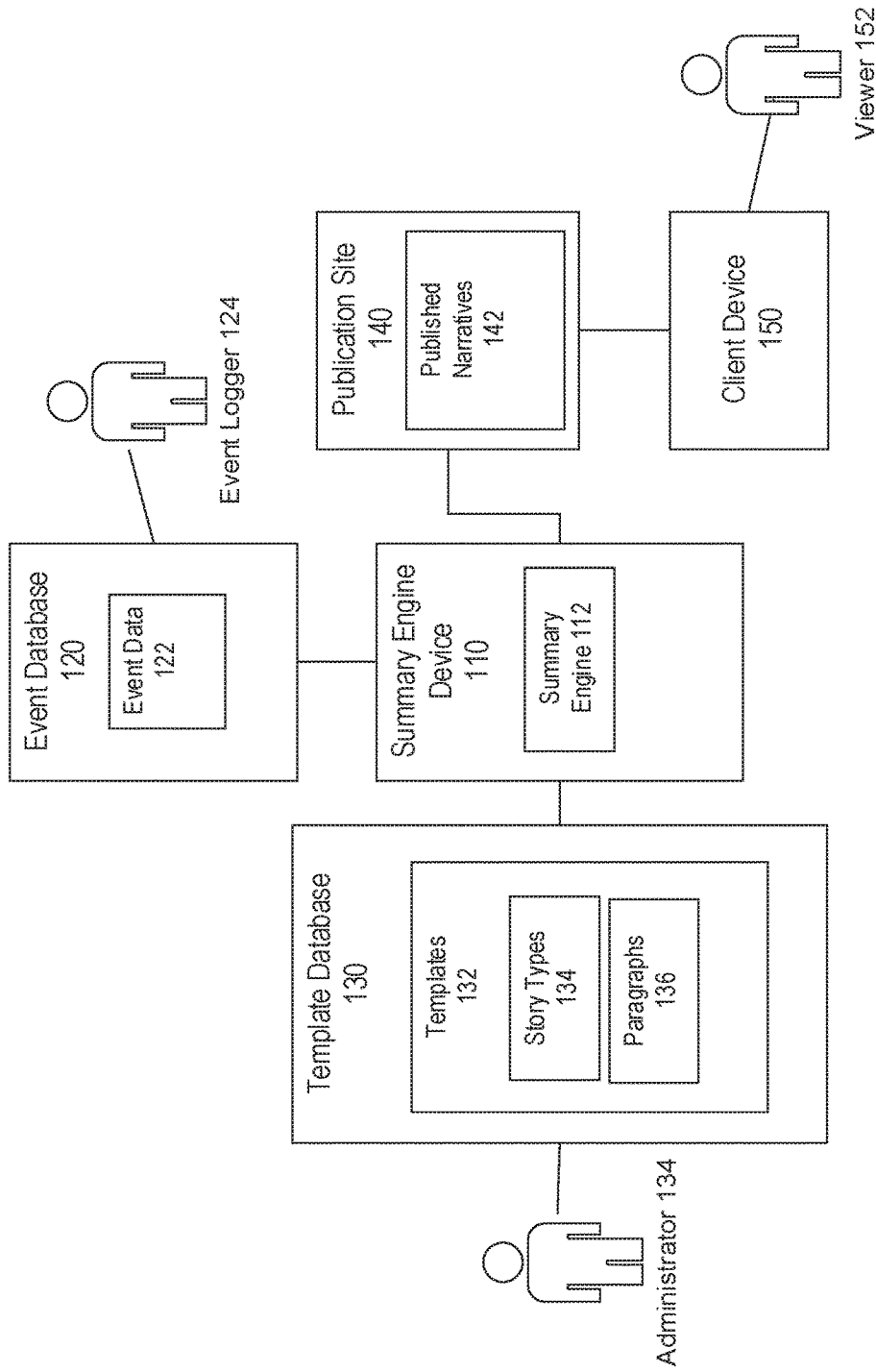
FIG. 1 illustrates a first system for providing a narrative summary in accordance with one or more embodiments.

FIG. 1 illustrates a narrative system 100 arranged to generate narrative summaries of events automatically based on data about the event. In an embodiment, narrative system 100 may use templates that include slots for data and for dynamic word choice. The templates may be chosen randomly. A sub-set of templates may be chosen according to criteria, and a template may be chosen randomly from the sub-set. Once the template is filled out to create a story, the story may be published in a variety of locations and formats.

In one embodiment, for example, the narrative system 100 may comprise a computer-implemented system having multiple components, such as a summary engine device 110, an event database 120, a template database 130, and a publication site 140. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the narrative system 100 may be implemented by one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the narrative system 100 as shown in FIG. 1 has a limited number of elements in a certain topology, it may be appreciated that the survey system 100 may include more or less elements in alternate topologies as desired for a given implementation.

The computing entities or devices of narrative system 100 may be communicatively coupled via a network, which may be implemented via various types of communications media, including wired or wireless communications media. The network may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The computing entities or devices of narrative system 100 may include various types of standard communication elements designed to be interoperable with the network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between computing entities or devices of survey system 100 can be in the form of a data packet adapted to be transmitted between two or more computer processes. The data packet may include a cookie and/or associated contextual information, for example.

In an embodiment, narrative system 100 may include summary engine device 110. Summary engine device 110 may include one or more electronic devices that are capable of receiving data about events, selecting a template, populating the template, and publishing the populated template. In particular, summary engine device 110 may include a summary engine 112. Summary engine 112 may include programming instructions that, when executed on a logic device, populate the slots in a template and publish it. Summary engine 112 is described further with respect to FIG. 4.

Narrative system 100 may include event database 120. Event database 120 may be stored on summary engine device 110, or may be stored on a different device accessible over communication media to summary engine device 110. While only one event database is shown, embodiments may include multiple event databases, storing data for different types of events.

Event database 120 may include event data 122. Event data 122 may include any data generated during the course of an event that describes some aspect of the event. For example, for a sports event, event data may include team data, such as team name, location, mascot, league, and coach's name; athlete information, such as name, player number, age, height, weight, and school; and event data, such as play type, distance gained/lost, pass length, assists, clock time, play result, and score. For a political event, event data may include politicians' names, party affiliation, voting record, number of votes received, and so forth. The embodiments are not limited to these examples.

The event data 122 may be entered into event database 120 by an event logger 124. Event logger 124 may be a person who witnesses or is involved in the event, such as a coach, team statistician, or an event observer. Event logger 124 may be a computer analysis application that generates data by analyzing visual information about the event, such as from a live or recorded video stream of the event.

Narrative system 100 may include template database 130. Template database 130 may be stored on summary engine device 110, or may be stored on a different device accessible over communication media to summary engine device 110. Template database 13 may include templates 132.

Templates 132 may include story types 134 and paragraphs 136. A story type 134 may be a container for various narrative structures. A story type 134 may, for example, include different lists of words and different paragraph types to choose from. Selecting a particular story type 134 from among multiple story types 134 may constrain the choices when building a story from templates 132. Paragraphs 136 may include specific sets of sentences that include both static text and slots for dynamic data and/or word choice. Story types 134 are described further with respect to FIG. 2. Paragraphs 136 are described further with respect to FIG. 3.

Templates 132 may be generated by an administrator 134. An administrator 134 may be a person who writes the sentences and paragraphs that may be included in a template 132. Administrator 134 may further create lists of words that may be used to fill a dynamic word slot. Administrator 134 may also set conditions that, when satisfied, direct a choice during a story generation. In an embodiment, administrator 134 may be partly or completely automated using a computer application.

Narrative system 100 may include a publication site 140. Publication site 140 may be a component of summary engine device 110, or may be separate from summary engine device 110. Publication site 140 may include, without limitation, a website, a real simple syndication (RSS) feed, an e-mail message, a news ticker, a social network site, a short messaging service (SMS) message, a multimedia messaging service (MMS) message, a text-to-speech telephone message; and a radio broadcast.

Publication site 140 may include published narratives 142. Published narratives 142 may include a representation, e.g. text, audio, and/or video, of a template 132 that has been filled with event data 122. Published narratives 142 may be presented from hypertext markup language (HTML) coded pages, extensible markup language (XML) coded pages, JAVA applets, plain text, and so forth, or a combination thereof. Published narratives 142 may be presented as an audio stream generated by a text-to-speech conversion from the filled template. Published narratives 142 may be presented as a video stream created from a computer image, such as an avatar, "speaking" the story from a text-to-speech conversion from the filled template. The embodiments are not limited to these examples. While one publication site 140 is shown in FIG. 1, embodiments may include multiple publication sites 140, for example, for each different type of publication. In an embodiment, published narratives 142 may be stored, e.g. as an archive, on publication site 140 and/or on summary engine device 110 and/or on event database 120.

Narrative system 100 may include a client device 150. Client device 150 may be a wired or wireless computing device operating a browser, application viewer or other application program suitable for receiving and displaying published narratives 142 from publication site 140. Client device 150 may receive and respond to control directives from a viewer 152 via a suitable GUI and various input/output (I/O) devices, such as input from an input device that causes a browser to connect to publication site 140 and received a published narrative 142. Examples of suitable web browsers may include, without limitation, Internet Explorer® by Microsoft® Corp., Safari® by Apple Inc., or Chrome® by Google®, among others.

Figure 2:
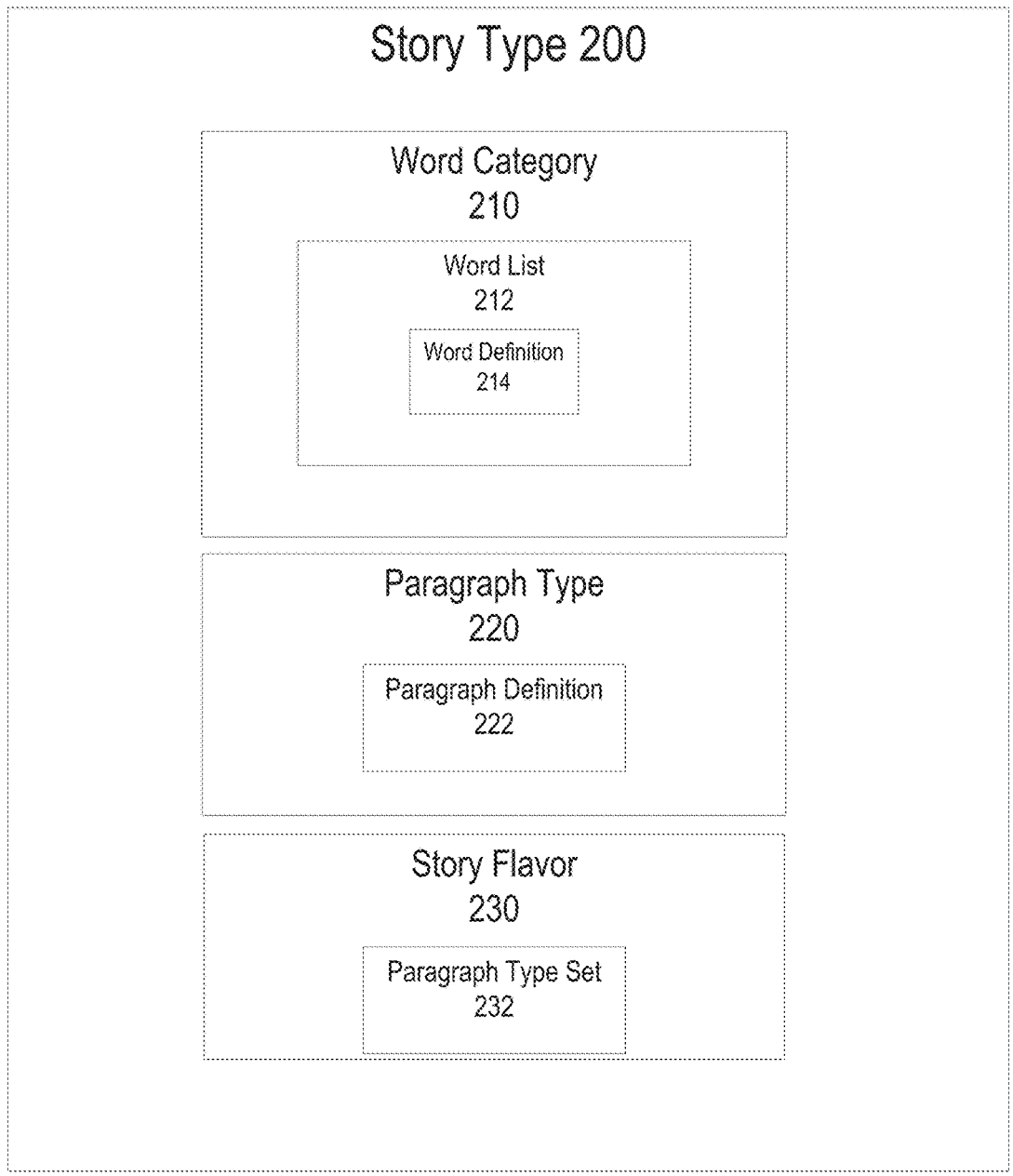
FIG. 2 illustrates a story type structure in accordance with one or more embodiments.

FIG. 2 illustrates a story type 200 in accordance with one or more embodiments. Story type 200 may be a logical container structure for various template components. A story type may generally describe the story that is told by the story type. For sports events, for example, different story types may include a contest summary, an athlete contest summary, and an individual play summary. A contest summary may be a story type that describes an event overall, with information about both teams. An athlete contest summary may be a story type that describes an individual athlete's performance during an event. An individual play summary may be a story type that describes a specific play for a specific team during an event. Story types may be mixed and combined to generate a template 132 for an event.

As shown in FIG. 2, story type 200 may include one or more word categories 210. A word category 210 may be a container for sets of word lists 212. A word category 210 may be associated with properties such as a specific sport.

A word list 212 may be a container, e.g. an array, for a set of word definitions 214. A word list 212 may optionally be bound to a data field from event data 122 such that the value of a data element may affect word choice in filling in the template. For example, one data field may include a point spread value. When the point spread is larger than some threshold, 40 points for example, words that express the magnitude of the score difference may be chosen, e.g. "clobbered," "never had a chance," "shut-out" and so forth.

Word definitions 214 may include specific words or phrases, e.g. static text strings, that may be used in a paragraph. In an embodiment, a particular word list 212 may include word definitions 214 that are essentially synonyms. Selecting a particular word definition 214 from the word list 212 may therefore still convey the same meaning as any other word definition from the same word list 212, while providing variety among instances when the same sentence is used.

Word definitions 214 in a word list 212 that is bound to a data field may include a margin value. A margin value may include a range of values to which the data in the associated data field may be compared. When the data in the data field is within the margin for the word definition 214, a condition may be satisfied that causes the word definition 214 to be used.

Story type 200 may also include one or more paragraph types 220. A paragraph type 220 may be a container for a set of paragraph definitions 222. A paragraph type 200 may describe the paragraph in some way, for example, by what data is presented, by what tone is conveyed, and so forth. A paragraph type 220 may optionally be tied to a specific sport or event type. A paragraph type 220 that is not tied to a specific sport or event type may be used for any event that uses the story type 200 containing the paragraph type 220.

Paragraph definitions 222 may include the actual paragraph "blueprint" or template. Paragraph definitions 222 may, for example, include specific sentences, including static text, and the template slots to receive data and word choices from word lists 212. An example of a paragraph definition 222 is described in further detail with respect to FIG. 3.

Story type 200 may also include one or more story flavors 230. A flavor may represent a style, tone, theme, or other grouping and structure of paragraphs in a story. A story flavor 230 may include a paragraph types set 232, which may be a list of references to a set of paragraph types 220 that may be used for a particular story flavor 230. A story flavor 230 may be optionally reserved for a specific event type, or may be open to use for any event.

Figure 3:
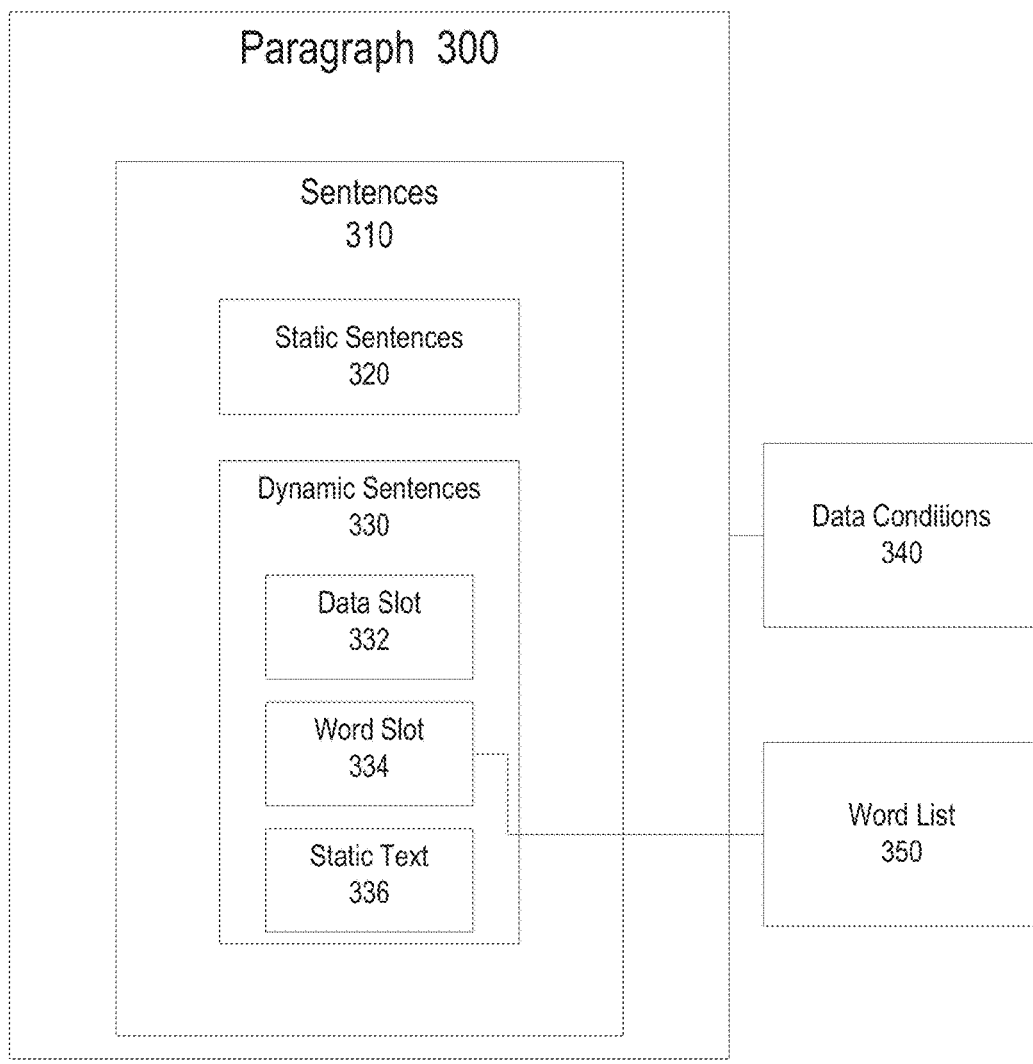
FIG. 3 illustrates a paragraph structure in accordance with one or more embodiments.

FIG. 3 illustrates a paragraph 300 in accordance with one or more embodiments. Paragraph 300 may be a representative example of a paragraph definition 222. As in written grammar, a paragraph 300 may be a group of closely related sentences that convey one topical point. As such, paragraph 300 may include one or more sentences 310.

Sentences 310 may include static sentences 320. Static sentences 320 may be sentences that have no variable elements. That is, none of the words in a static sentence 320 may be changed by summary engine 110.

Sentences 310 may include dynamic sentences 330. Dynamic sentences 330 may have at least one variable element. For example, a dynamic sentence 330 may have a data slot 332. A data slot 332 may be a placeholder in dynamic sentence 330 that may be filled with an item of event data 122. A data slot 332 may exist, for example, for a team name, a player name, a date, a location, a score, and so forth. A data slot 332 allows a dynamic sentence 330 to be re-used for multiple events.

Dynamic sentences 330 may include a word slot 334. A word slot 334 may be a placeholder in dynamic sentence 330 that may be filled with a word definition 214 from word list 350. Word list 350 may be a representative embodiment of word list 212. A particular word definition 214 may be selected to fill a word slot 334 randomly from word list 350. In an embodiment, word slots 334 may be used generally for adjectives, adverbs, verbs and some nouns.

A dynamic sentence 330 may include static words 336. Static words 336 are words that are not variable. Static words 336 may include, for example, articles, prepositions, and punctuation.

In an embodiment, sentences 310 may be affected by data conditions 340. Data conditions 340 may be used to control the flow of a story according to conditions in the event data 122 for a story. A data condition 340 may generally have true or false value. A data condition 340 may determine which of several sentences or paragraphs are selected for a story. A data condition 340 may determine what word list 350 to choose from to fill a word slot 334. For example, if a team wins an event, a paragraph type associated with a win event may be selected instead of a paragraph type that is associated with a loss event.

In an embodiment, a data condition 340 may refer to a margin. A data item for a data slot may be analyzed to determine whether it lies within the margin. The data slot may be associated with a word list for a word slot. When the data item for the data slot is within the margin, a word from a first word list may be selected for the associated word slot. When the data item is outside of the margin, or within a second margin, a word from a second, different, word list may be selected for the associated word slot. In an embodiment, when the data item is outside of a margin, the sentence or paragraph containing the associated word slot may be omitted from the template.

Figure 4:
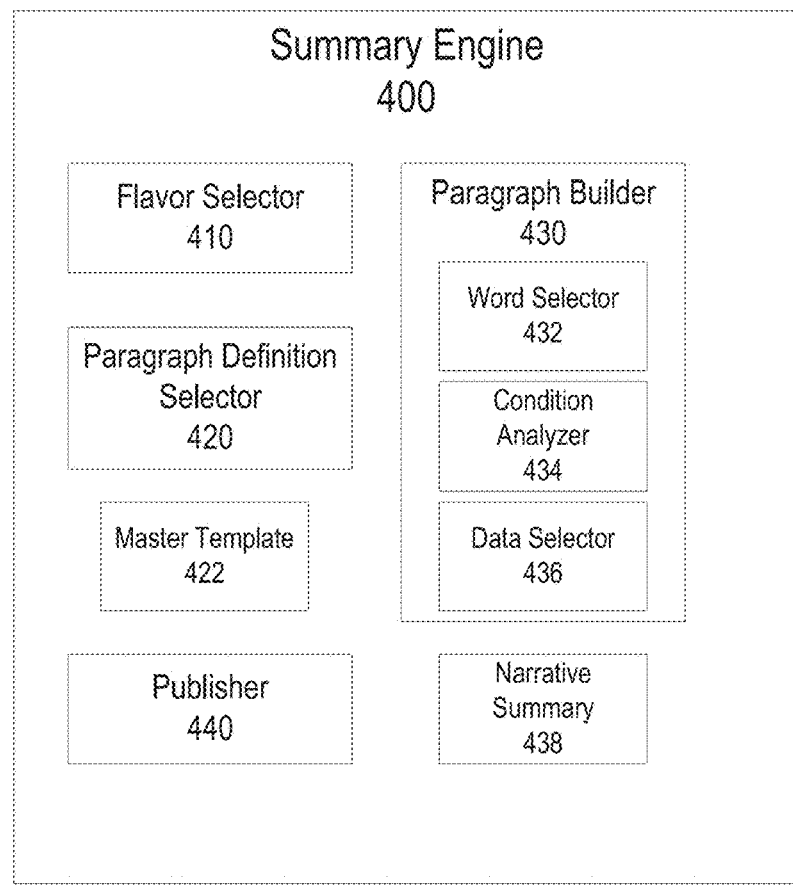
FIG. 4 illustrates a summary engine in accordance with one or more embodiments.

FIG. 4 illustrates an embodiment of a summary engine 400. Summary engine 400 may be a representative embodiment of summary engine 112. Summary engine 400 may include one or more functional components, such as a flavor selector 410, a paragraph definition selector 420, a paragraph builder 430, and a publisher 440. Summary engine 400 may have more, fewer, or other functional components than those depicted.

Summary engine 400 may periodically examine event data 122 and identify new content in event data 122 that has not had a narrative summary generated for it yet. In an embodiment, when new content exists, summary engine 400 may determine what story type would apply to the new content and whether all of the data needed for that story type is present. When enough new content exists for a story type 134, 200, summary engine 400 may begin generating a narrative summary.

Flavor selector 410 may select a story flavor 230 for the selected story type 134, 200. In an embodiment, the story flavor 230 may be chosen at random from the story flavors associated with the story type selected for the event data. In another embodiment, the story flavor 230 may be selected, at least in part, according to a set of criteria, for example, what event data 122 is available.

Paragraph definition selector 420 may select a paragraph definition 222 for each paragraph type 220 associated with the selected story flavor 230. Paragraph definition selector 420 may randomly choose a paragraph definition 222 within a given paragraph type 220. In an embodiment, paragraph definition selector 420 may randomly select a paragraph definition 222 according to a set of criteria, for example, what event data 122 is available. The paragraph definitions 222 selected for a particular narrative summary may be appended together to form a master template 422.

Paragraph builder 430 may load a paragraph 300 for each of the paragraph definitions 222 in the master template 422. Paragraph builder 430 may parse the paragraph 300 to determine what word slots 334 and data slots 332 are to be filled. Paragraph builder 430 may have a word selector 432 component to select a word at random from a word list 350 associated with a word slot 334. Paragraph builder 430 may have a data selector 436 component to insert an actual data value from event data 122 into a data slot 332. Paragraph builder 430 may have a condition analyzer 434 component to evaluate conditions that are present in a paragraph definition 222, or associated with a story flavor 230 or story type 200. When a condition is true, a choice associated with the condition is followed. For example, an additional sentence or paragraph may be added to master template 422, or one word list may be chosen instead of another. The embodiments are not limited to these examples.

When paragraph builder 430 has filled all word and data slots, and evaluated all conditions in master template 422, the result is narrative summary 438. Narrative summary 438 may be, for example and without limitation, a text file, a rich text file, an HTML file, or an XML file.

Publisher 440 may receive the narrative summary 438 from paragraph builder 430 and may prepare the narrative summary 438 for publication. Preparing narrative summary 438 may include formatting the narrative summary 438 according to a format used by publication site 140. For example, publisher 440 may convert a text file narrative summary to an HTML file or XML file for publication on a website. In another example, publisher 440 may use text-to-speech conversion on a text file narrative summary to generate an audio stream. The embodiments are not limited to these examples.

Figure 5:
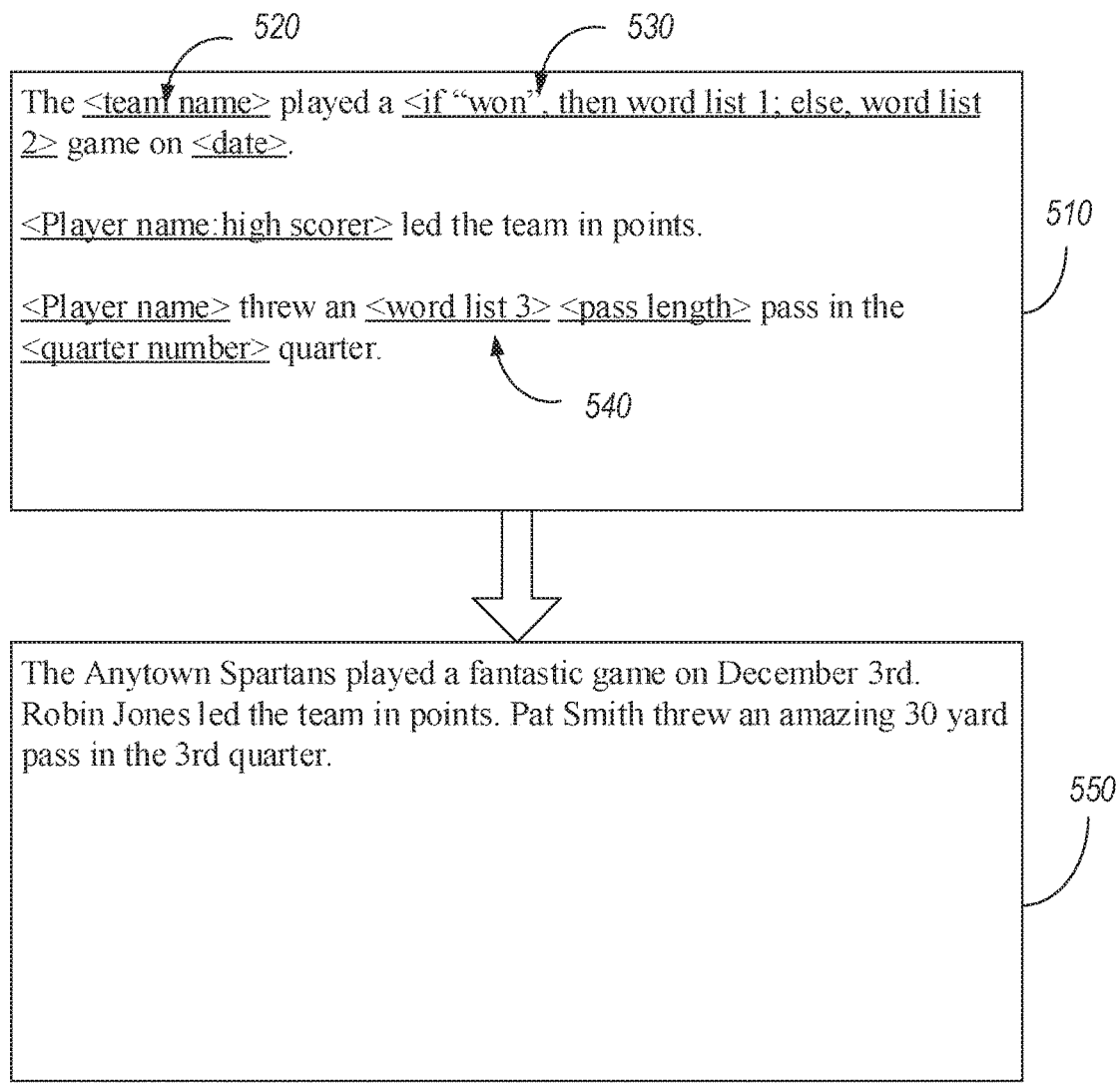
FIG. 5 illustrates an example of a template before and after a narrative summary is generated in accordance with one or more embodiments.

FIG. 5 illustrates an example of a portion of a master template 510, in pseudo code, before and after the word and data slots are filled. Master template 510 has, for example, a data slot 520, a conditional word slot 530 and a word slot 540. Data slot 520 is a placeholder for a team name. Conditional word slot 530 has a condition that determines which word list to select from, depending on whether the team has won or lost. Word slot 540 indicates that a word is to be selected from word list 3. The sentences within master template 510 are shown spaced apart for clarity, and may be more closely spaced in an embodiment.

When master template 510 has been processed by paragraph builder 430, in an embodiment, it may look like narrative summary 550. In narrative summary 550, data slot 520 has been filled with the team name of "Anytown Spartans." Conditional word slot 530 evaluated to "true" and a positive word "fantastic" was selected randomly from word list 1. Word list 1 may include, for example, positive praising adjectives. Word list 2 may have included, for example, critical adjectives related to loss. Word slot 540 was filled randomly from word list 3 with the word "amazing."

Figure 6:
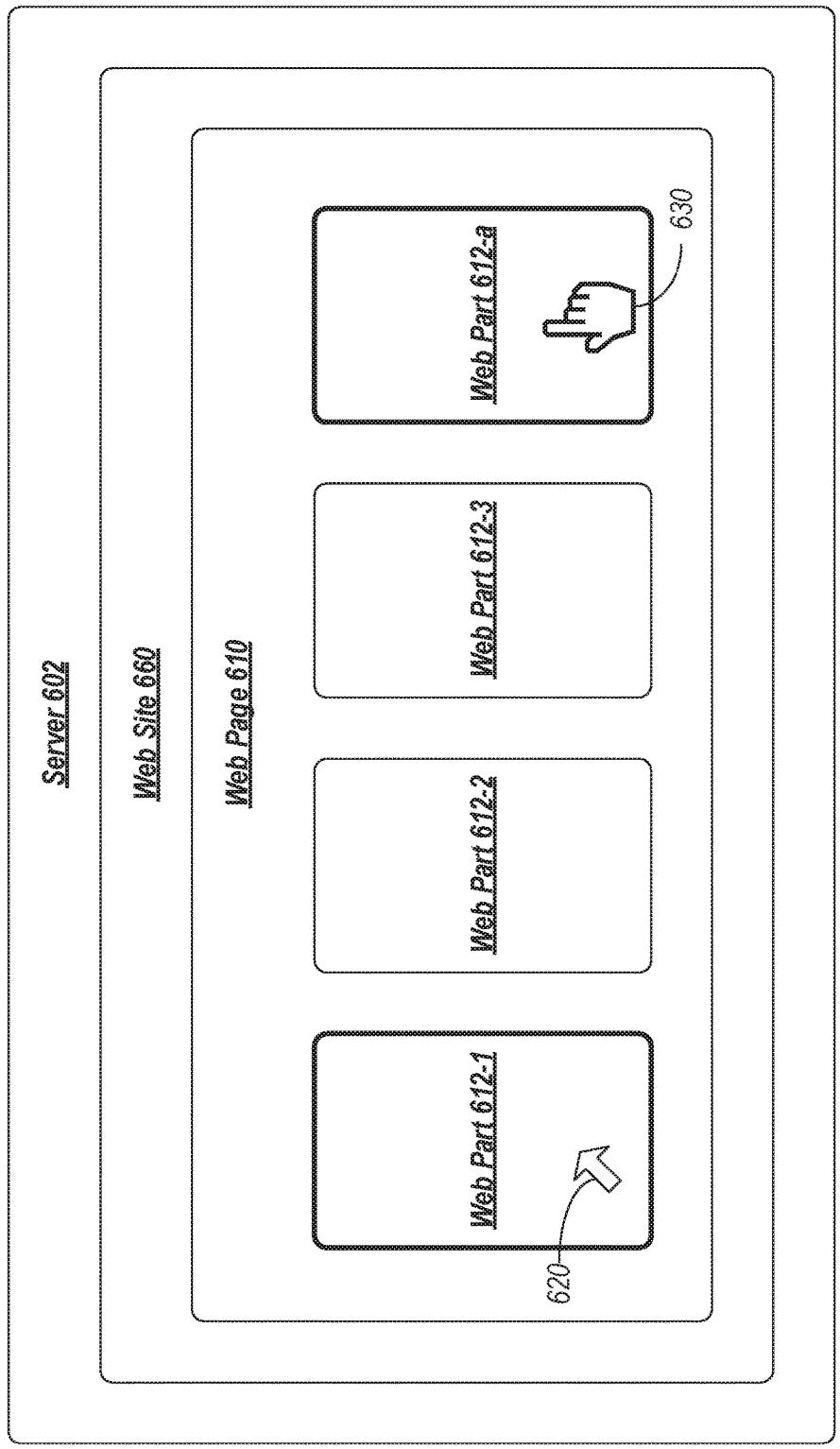
FIG. 6 illustrates an example of a user interface.

FIG. 6 illustrates an embodiment of a user interface view 600. The user interface view 600 illustrates an embodiment where a server 602 hosts content on a web site 660, which is implemented as one or more web pages 610. Server 602 and web site 660 may be representative embodiments of a publication site 140. The web page 610 may comprise, for example, a landing page or home page for web site 660. The web page 610 may include various user interface elements designated as web parts 612-a, with a representing any positive integer. A user, e.g. viewer 152, may select various web parts 614-a using any number of input devices, such as by manipulating a pointer interface 620 or a gesture interface 630, for example.

Referring to FIG. 6, web site 660 may include a web page 610 that displays a published narrative 142. For example, suppose web part 612-1 displays a published narrative 142, web part 612-2 may display another published narrative 142, and web part 612-a displays an advertisement for a product or service. Web part 612-3 may display information such as web site navigation links, viewer comments, a search interface, and so forth. Adding new published narratives 142 frequently may encourage viewers 152 to return to web site 660 often, which may increase advertising revenue from the increased traffic.

In an embodiment, web site 600 may keep track of what published narratives 142 are of interest to a particular viewer 152, for example, by noting which published narratives are read, shared, forwarded, and so forth, in a cookie file, for example. In an embodiment, web site 600 may provide feedback to summary engine 112 about the viewer 152's interests and obtain published narratives that are more closely aligned to the viewer 152's interests. The embodiments are not limited to these examples.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). Embodiments may also be at least partly implemented as instructions contained in or on a computer-readable medium, which may be read and executed by one or more processing units to enable performance of the operations described herein.

Figure 7:
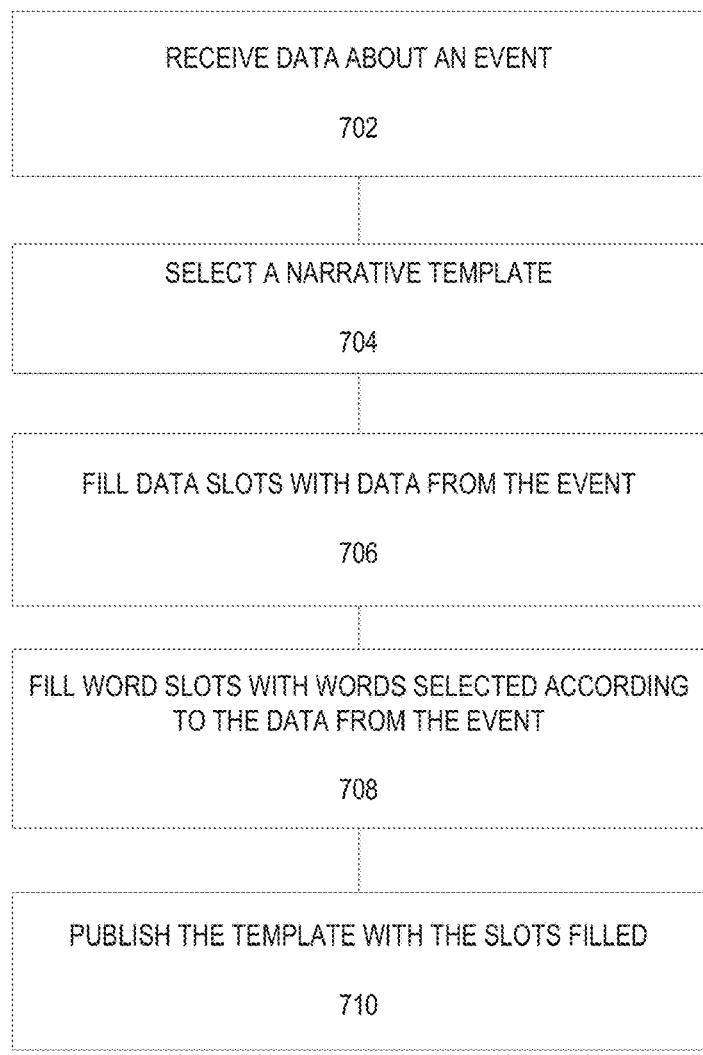
FIG. 7 illustrates a logic flow in accordance with one or more embodiments.

FIG. 7 illustrates a logic flow 700 in accordance with one or more embodiments. The logic flow 700 may be performed by various systems and/or devices and may be implemented as hardware, software, and/or any combination thereof, as desired for a given set of design parameters or performance constraints. For example, the logic flow 700 may be implemented by a logic device (e.g., processor) and/or logic (e.g., threading logic) comprising instructions, data, and/or code to be executed by a logic device. For purposes of illustration, and not limitation, the logic flow 700 is described with reference to FIGS. 1 through 4. The embodiments are not limited in this context.

In various embodiments, logic flow 700 may receive data about an event in block 702. For example, summary engine 112 may poll event database 120 for new event data 122. Summary engine 112 may also, or in the alternative, receive a notification from event database 120 that there is new event data 122. "New" in the context of logic flow 700 may refer to event data 122 added to event database 120 after a previous interaction with summary engine 112, or event data that has not been used in a narrative summary before. Summary engine 112 may, in an embodiment, select a story type 200 and then poll event database 120 for new event data 122 that may be used for that story type. Summary engine 112 may fetch or receive the new event data 122.

In various embodiments, logic flow 700 may select a narrative template in block 704. For example, summary engine 400 may select a story type 200, story flavor 230, and paragraph definitions 222 to generate a master template 422. Selecting a narrative template is described further with respect to FIG. 8.

In various embodiments, logic flow 700 may fill data slots with data from the event in block 706. For example, data selector 436 may identify what data elements from event data 122 may be used to fill in a data slot 332 and replace the data slot with the data in the master template 422.

In various embodiments, logic flow 700 may fill word slots with words selected according to the data from the event in block 708. For example, word selector 432 may select a word definition from a word list 350 for a word slot 334 and replace the word slot 334 with the word definition in the master template 422. In an embodiment, the selection of a word from a word list 350 may be random. At the conclusion of block 708, the master template 422 may be a narrative summary 438.

In various embodiments, logic flow 700 may publish the template with the slots filled in block 710. For example, publisher 440 may format a narrative summary 438 according to a publication site 140. For example, if publication site 140 is a web site, narrative summary 438 may be formatted as an HTML or XML document and stored on publication site 140 such that the narrative summary 438 is viewable as a published narrative 142 when the web site is accessed by a browser application on a client device 150. The embodiments are not limited to these examples.

Figure 8:
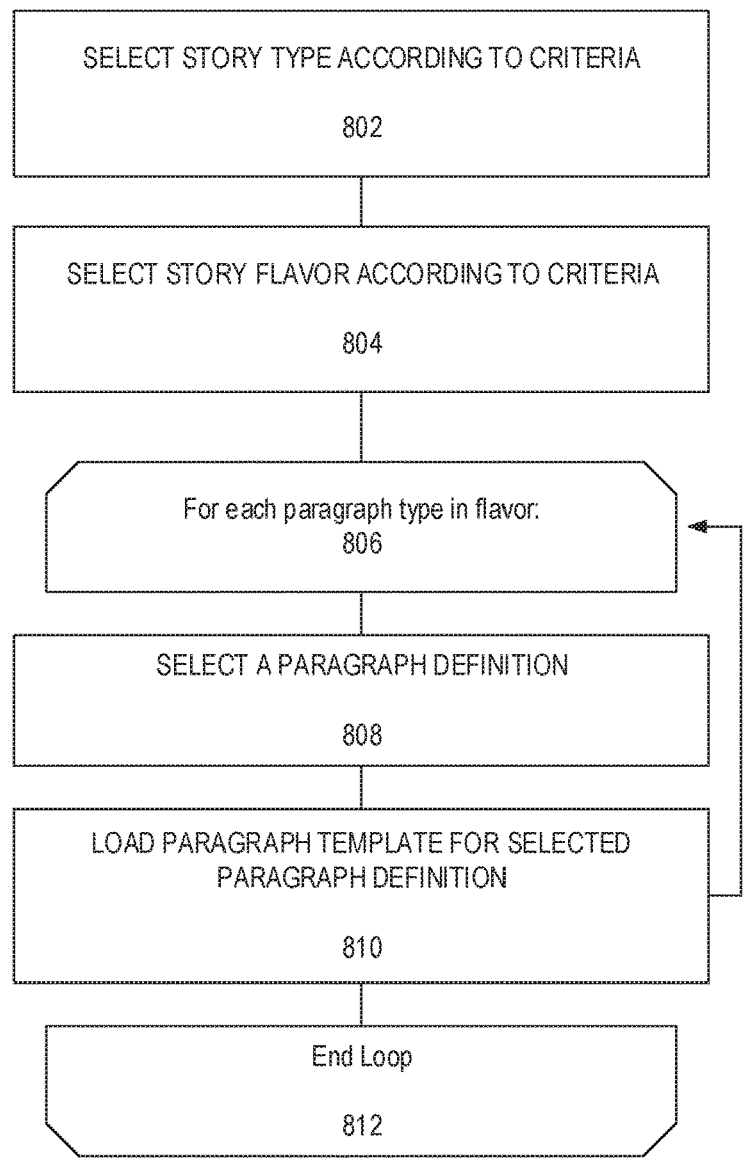
FIG. 8 illustrates a second logic flow in accordance with one or more embodiments.

FIG. 8 illustrates a logic flow 800 in accordance with one or more embodiments. Logic flow 800 may be a representative embodiment of block 704 in logic flow 700. Logic flow 800 may be performed by various systems and/or devices and may be implemented as hardware, software, and/or any combination thereof, as desired for a given set of design parameters or performance constraints. For example, the logic flow 800 may be implemented by a logic device (e.g., processor) and/or logic (e.g., threading logic) comprising instructions, data, and/or code to be executed by a logic device. For purposes of illustration, and not limitation, the logic flow 800 is described with reference to FIGS. 1 through 4. The embodiments are not limited in this context.

In various embodiments, logic flow 800 may select a story type according to criteria in block 802. For example, summary engine 400 may select a story type 200 according to what data elements are available in event data 122 received, or retrieved, from event database 120. For example, when data about an individual athlete's performance in an athletic event is available, an athlete contest summary type may be selected.

In various embodiments, logic flow 800 may select a story flavor according to criteria in block 804. When a story type 200 has more than one story flavor 230, a story flavor 230 may be selected randomly from the available choices, for example, by flavor selector 410. Criteria may be applied to the story flavors 230 for a story type 200 to narrow the available choices. Criteria may include, for example, what data elements are needed for a particular story flavor.

In various embodiments, logic flow 800 may, beginning at block 806, select a paragraph definition for each paragraph type in the story flavor at block 808. For example, paragraph definition selector 420 may use paragraph type set 232 for the selected story flavor. Paragraph type set 232 may include references or links to the paragraph types 220 that a story flavor 230 may use. Paragraph definition selector 420 may get a paragraph type 220 from the paragraph type set 232 of story flavor 230, and then select a paragraph definition 222 for that paragraph type 220.

In an embodiment, conditions within a paragraph definition 222 may be evaluated when a paragraph definition is selected to determine if additional paragraph definitions, or sentences, are to be appended to master template 422.

In various embodiments, logic flow 800 may load a paragraph template for the selected paragraph definition in block 810, for each paragraph type 220. For example, paragraph builder 430 may append a paragraph 300 to master template 422, including the static sentences 320, static text 336, data slots 332, and word slots 334 included in paragraph 300.

Blocks 808 and 810 may be repeated for each paragraph type 220 referenced in paragraph type set 232 for the selected story flavor 230. When a paragraph definition has been selected for each paragraph type, logic flow 800 may end at block 812.

Figure 9:
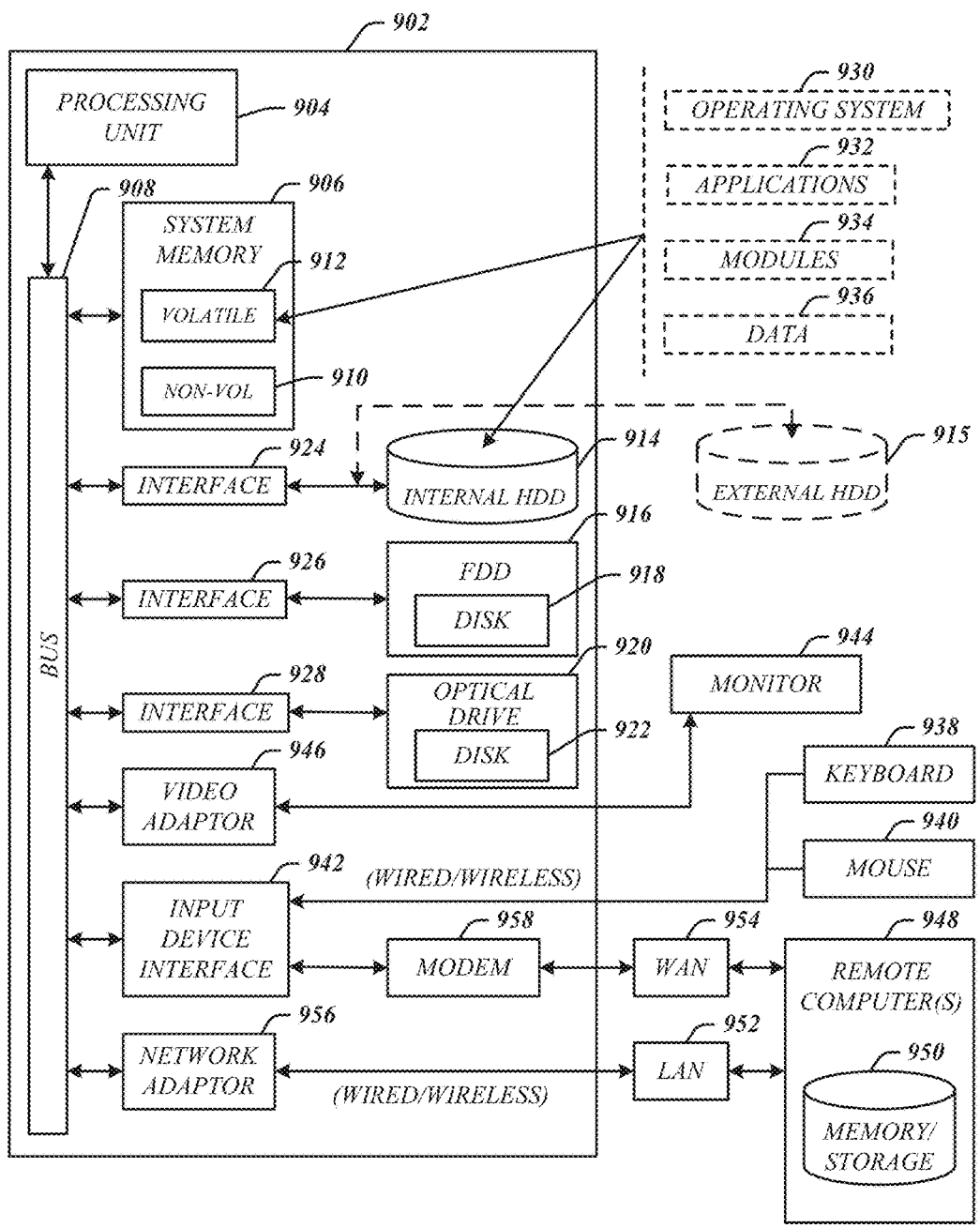
FIG. 9 illustrates a computing architecture in accordance with one or more embodiments.

FIG. 9 illustrates a computer architecture in accordance with one or more embodiments, suitable for implementing various embodiments as previously described. The computing architecture 900 includes various common computing elements, such as one or more processors, co-processors, memory units, chipsets, controllers, peripherals, interfaces, oscillators, timing devices, video cards, audio cards, multi-media input/output (I/O) components, and so forth. The embodiments, however, are not limited to implementation by the computing architecture 900.

As shown in FIG. 9, the computing architecture 900 comprises logic device(s) 904, a system memory 906 and a system bus 908. Examples of a logic device may include, without limitation, processing circuitry, such as a central processing unit (CPU), microcontroller, microprocessor, general purpose processor, dedicated processor, chip multi-processor (CMP), media processor, digital signal processor (DSP), network processor, co-processor, input/output processor, application specific integrated circuit (ASIC), field programmable gate array (FPGA), programmable logic device (PLD), and so forth. Dual microprocessors and other multi-processor architectures may also be employed as the logic device(s) 904. The system bus 908 provides an interface for system components including, but not limited to, the system memory 906 to the logic device(s) 904. The system bus 908 can be any of several types of bus structure that may further interconnect to a memory bus (with or without a memory controller), a peripheral bus, and a local bus using any of a variety of commercially available bus architectures.

The system memory 906 may include computer-readable storage media including various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may additionally include various types of computer-readable storage media, including an internal hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. The one or more application programs 932, other program modules 934, and program data 936 can include, for example, summary engine 112, 400.

A user can enter commands and information into the computer 902 through one or more wire/wireless input devices, for example, a keyboard 938 and a pointing device, such as a mouse 940. Other input devices may include a microphone, an infra-red (IR) remote control, a joystick, a game pad, a stylus pen, touch screen, or the like. These and other input devices are often connected to the logic device(s) 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
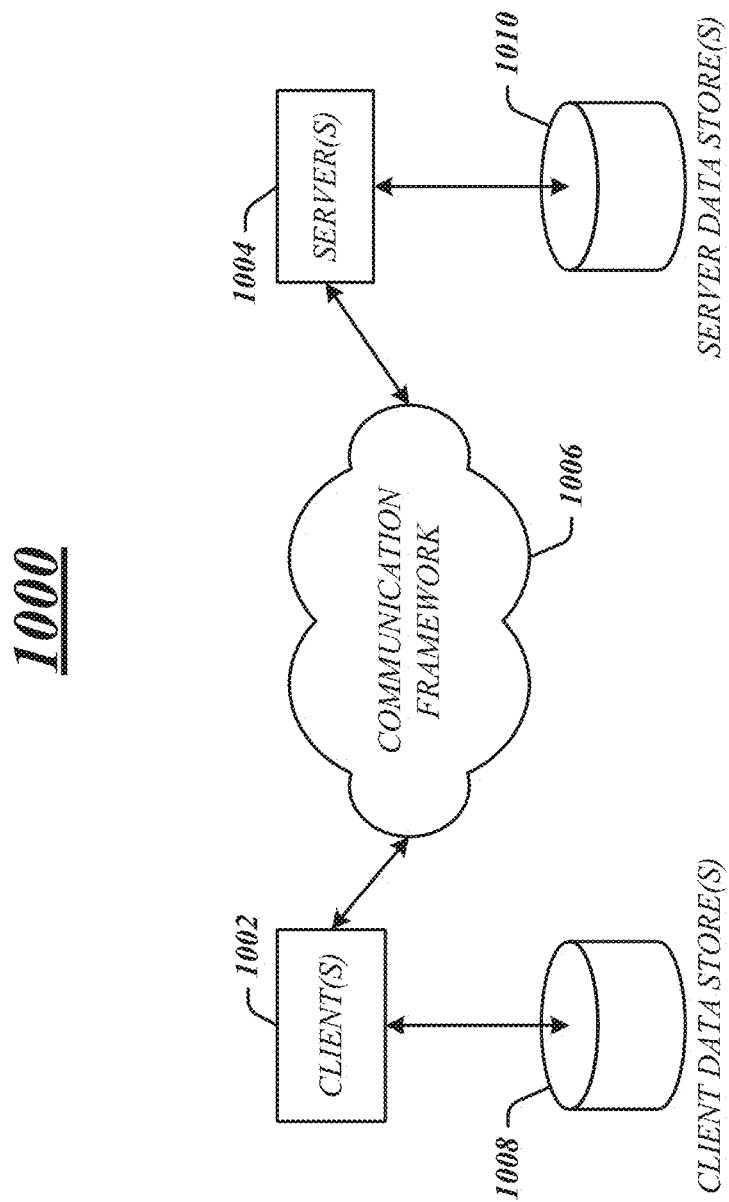
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 150. The servers 1004 may implement summary engine device 110, and publication site 140. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 1002 and the servers 1004 may include various types of standard communication elements designed to be interoperable with the communications framework 1006, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 1002 and a server 1004 can be in the form of a data packet adapted to be transmitted between two or more computer processes. The data packet may include a cookie and/or associated contextual information, for example.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

References to "one embodiment" or "an embodiment" mean that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A computer-implemented method comprising:
receiving a notification indicating that data about an event is in a database;
receiving the data about the event from the database, the received data comprising data generated by an application based on an analysis of visual information of a video of the event;
selecting a story type associated with a plurality of paragraph types, the story type comprising one or more word categories comprising a container for one or more sets of word lists, each word category associated with a set of properties, each word list comprising a container for word definitions comprising one or more synonyms, each word definition in each word list bound to a data item in the received event data comprising a range of values, the data item comprising one or more of a score of the event, a characteristic of an action taken during the event, statistical data about a participant's performance during the event, statistical data about a team's performance during the event, historical data about a team, and historical data about a participant, each paragraph type comprising a different set of a plurality of paragraph definitions, each paragraph definition comprising static text and an empty template slot in a plurality of sentences;
selecting a paragraph definition randomly from the set of the plurality of paragraph definitions for a first one of the plurality of associated paragraph types of the selected story type;
selecting an additional paragraph definition randomly from the set of the plurality of paragraph definitions for each of the remaining paragraph types of the selected story type;
appending the selected paragraph definitions together to form a master narrative template for the event, the master narrative template comprising the empty template slots of the selected paragraph definitions;
completing a narrative summary by:
filling a data empty template slot in the master narrative template with a data item from the received data;
selecting a word from a first word list of the one or more sets of word lists when a value of the data item to which the first word list is bound is within the range of values of the selected word;
randomly selecting a word from a second word list of the one or more sets of word lists when the value of the data item is not within the range of values; and
filling word empty template slots in the master narrative template with the selected words from the first and second word lists; and
publishing the narrative summary.

2. The method of claim 1, wherein the notification indicates that the data about the event is new data that has not been used to generate a narrative summary, wherein the received data comprises at least one of:
the score of the event;
a participant name;
a date of the event;
a time of the event;
a characteristic of a participant;
a position of a participant;
a team name;
the characteristic of the action taken during the event;
the statistical data about the participant's performance during the event;
the statistical data about the team's performance during the event;
play-by-play data;
the historical data about the team;
a result of a participant action;
an election result; and
the historical data about the participant.

3. The method of claim 1, wherein the template comprises a condition, the method further comprising:
determining a state of the condition according to the received data; and
selecting a first template sub-section to include when the condition is true and a second template sub-section to include when the condition is false.

4. The method of claim 3, wherein a template sub-section comprises at least one of: a word, a sentence, and a paragraph.

5. The method of claim 1, further comprising:
generating a text-to-speech version of the narrative summary comprising speech of the published narrative summary; and
publishing the text-to-speech version of the published narrative summary template.

6. The method of claim 1, wherein the event is one of:
a high school sports event;
a little league sports event;
a recreational league sports event;
a college sports event;
a professional sports event;
an amateur sports event;
a team sports event;
an individual sports event;
a contest;
a reality television show;
a concert;
a live event;
a game;

a tournament;
a political event; and
a fund raising event.

7. An apparatus comprising:
a logic device comprising processing circuitry;
a memory storing instructions which when executed by the logic device cause the logic device to:
  receive a notification indicating that data about an event is in a database;
  receive the data about the event from the database, the received data comprising data generated by an application based on an analysis of visual information of a video of the event;
  select a story type associated with a plurality of paragraph types, the story type comprising one or more word categories comprising a container for one or more sets of word lists, each word category associated with a set of properties, each word list comprising a container for word definitions comprising one or more synonyms, each word definition in each word list bound to a data item in the received event data comprising a range of values, the data item comprising one or more of a score of the event, a characteristic of an action taken during the event, statistical data about a participant's performance during the event, statistical data about a team's performance during the event, historical data about a team, and historical data about a participant, each paragraph type comprising a different set of a plurality of paragraph definitions, each paragraph definition comprising static text and an empty template slot in a plurality of sentences;
  select a paragraph definition randomly from the set of the plurality of paragraph definitions for a first one of the plurality of associated paragraph types of the selected story type;
  select an additional paragraph definition randomly from the set of the plurality of paragraph definitions for each of the remaining paragraph types of the selected story type;
  append the selected paragraph definitions together to form a master narrative template for the event, the master narrative template comprising the empty template slots of the selected paragraph definitions;
  complete a narrative summary by:
    filling a data empty template slot in the master narrative template with a data item from the received data;
    selecting a word from a first word list of the one or more sets of word lists when a value of the data item to which the first word list is bound is within the range of values of the selected word;
    randomly selecting a word from a second word list of the one or more sets of word lists when the value of the data item is not within the range of values; and
    filling word empty template slots in the master narrative template with the selected words from the first and second word lists; and
  publishing the narrative summary.

8. The apparatus of claim 7, wherein the notification indicates that the data about the event is new data that has not been used to generate a narrative summary, the narrative summary published to at least one of:
a website;
a real simple syndication feed;
an e-mail message;
a news ticker;
a social network site;
a short messaging service message;
a multimedia messaging service message;
a text-to-speech telephone message;
an audio stream; and
a radio broadcast.

9. The apparatus of claim 7,
wherein the story type comprises a plurality of story flavors, wherein a story flavor comprises a plurality of paragraph types, wherein a paragraph definition comprises at least one of: a static sentence, and a dynamic sentence comprising at least one of a word slot and a data slot.

10. The apparatus of claim 9, the memory storing instructions executable by the logic device to:
select the story type from a plurality of story types according to criteria;
select a story flavor randomly from the story flavors of the selected story type; and
select a paragraph definition randomly for each paragraph type of the selected story flavor.

11. The apparatus of claim 10, wherein the narrative template includes a condition, the memory storing instructions executable by the logic device to:
determine a state of the condition according to the received data; and
select a first template sub-section to include when the condition is true and a second template sub-section to include when the condition is false.

12. The apparatus of claim 11, wherein a template sub-section comprises at least one of: a word, a sentence, and a paragraph definition.

13. A non-transitory computer-readable storage medium comprising instructions that when executed cause a computing system to:
receive a notification indicating that data about an event is in a database;
receive the data about the event from the database, the received data comprising data generated by an application based on an analysis of visual information of a video of the event;
select a story type associated with a plurality of paragraph types, the story type comprising one or more word categories comprising a container for one or more sets of word lists, each word category associated with a set of properties, each word list comprising a container for word definitions comprising one or more synonyms, each word definition in each word list bound to a data item in the received event data comprising a range of values, the data item comprising one or more of a score of the event, a characteristic of an action taken during the event, statistical data about a participant's performance during the event, statistical data about a team's performance during the event, historical data about a team, and historical data about a participant, each paragraph type comprising a different set of a plurality of paragraph definitions, each paragraph definition comprising static text and an empty template slot in a plurality of sentences;
select a paragraph definition randomly from the set of the plurality of paragraph definitions for each of the plurality of associated paragraph types of the selected story type;

select a subsequent paragraph definition randomly from the set of the plurality of paragraph definitions for each of the remaining paragraph types of the selected story type;

append the selected paragraph definitions together to form a master template for the event, the master template comprising the empty template slots of the selected paragraph definitions;

generate a narrative summary by:
  filling a data empty template slot in the master template with a data item from the received data,
  selecting a word from a first word list of the one or more sets of word lists when a value of the data item to which the first word list is bound is within the range of values of the selected word;
  randomly selecting a word from a second word list of the one or more sets of word lists when the value of the data item is not within the range of values; and
  filling word empty template slots in the master narrative template with the selected words from the first and second word lists; and publish the narrative summary.

14. The storage medium of claim 13, wherein a story type comprises a plurality of story flavors, wherein a story flavor comprises a plurality of paragraph types, wherein a paragraph definition comprises at least one of: a static sentence, and a dynamic sentence comprising at least one of: a word slot and a data slot.

15. The storage medium of claim 14, further comprising instructions that when executed cause the computing system to:
  select a story flavor randomly from the story flavors of the selected story type;
  select a paragraph definition randomly for each paragraph type of the selected story flavor; and
  construct the master template from the selected paragraph definitions.

16. The storage medium of claim 14, further comprising instructions that when executed cause the computing system to:
  fill a data slot in the master template with a data item from the received data.

17. The storage medium of claim 14, wherein the master template includes a condition, the storage medium further comprising instructions that when executed cause the computing system to:
  determine a state of the condition according to the data; and
  select a first template sub-section to include when the condition is true and a second template sub-section to include when the condition is false.

18. The storage medium of claim 13, wherein the notification indicates that the data about the event is new data that has not been used to generate a narrative summary, further comprising instructions that when executed cause the computing system to format the narrative summary to publish to at least one of:
  a website;
  a real simple syndication feed;
  an e-mail message;
  a news ticker;
  a social network site;
  a short messaging service message;
  a multimedia messaging service message;
  a text-to-speech telephone message;
  an audio stream; and
  a radio broadcast.

* * * * *